Dec. 25, 1928.

H. H. GREEN 1,696,300

STEERING MECHANISM

Original Filed June 10, 1926    3 Sheets-Sheet 1

Inventor
H. H. Green

By Lacey & Lacey, Attorneys

Dec. 25, 1928.  H. H. GREEN  1,696,300

STEERING MECHANISM

Original Filed June 10, 1926    3 Sheets-Sheet 3

Inventor
H. H. Green
By Lacey & Lacey, Attorneys

Patented Dec. 25, 1928.

1,696,300

UNITED STATES PATENT OFFICE.

HOWARD H. GREEN, OF BARDWELL, TEXAS.

STEERING MECHANISM.

Original application filed June 10, 1926, Serial No. 114,997. Divided and this application filed November 26, 1926. Serial No. 150,983.

This invention relates generally to motor-driven agricultural machines and has special reference to the steering mechanism therefor, the present application being a division of an application filed by me June 10, 1926, Serial No. 114,997.

The object of the present invention is to provide novel means whereby the machine may be easily held to the desired path and may be caused to make a short turn at the side of a field or the end of a row. The invention is illustrated in the accompanying drawings and will be hereinafter fully described, the novel features being particularly pointed out in the appended claim.

Figure 1:
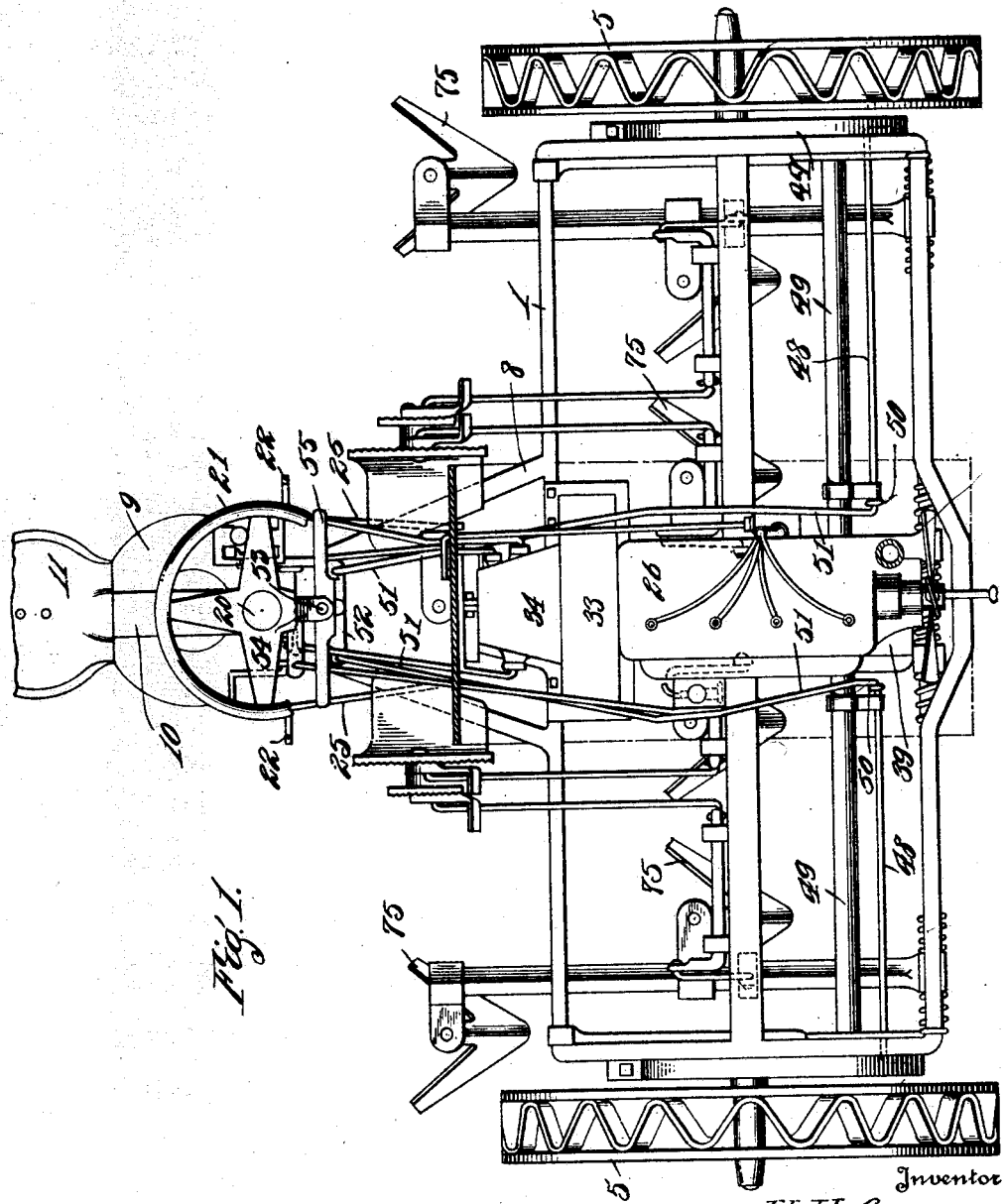
Figure 2:
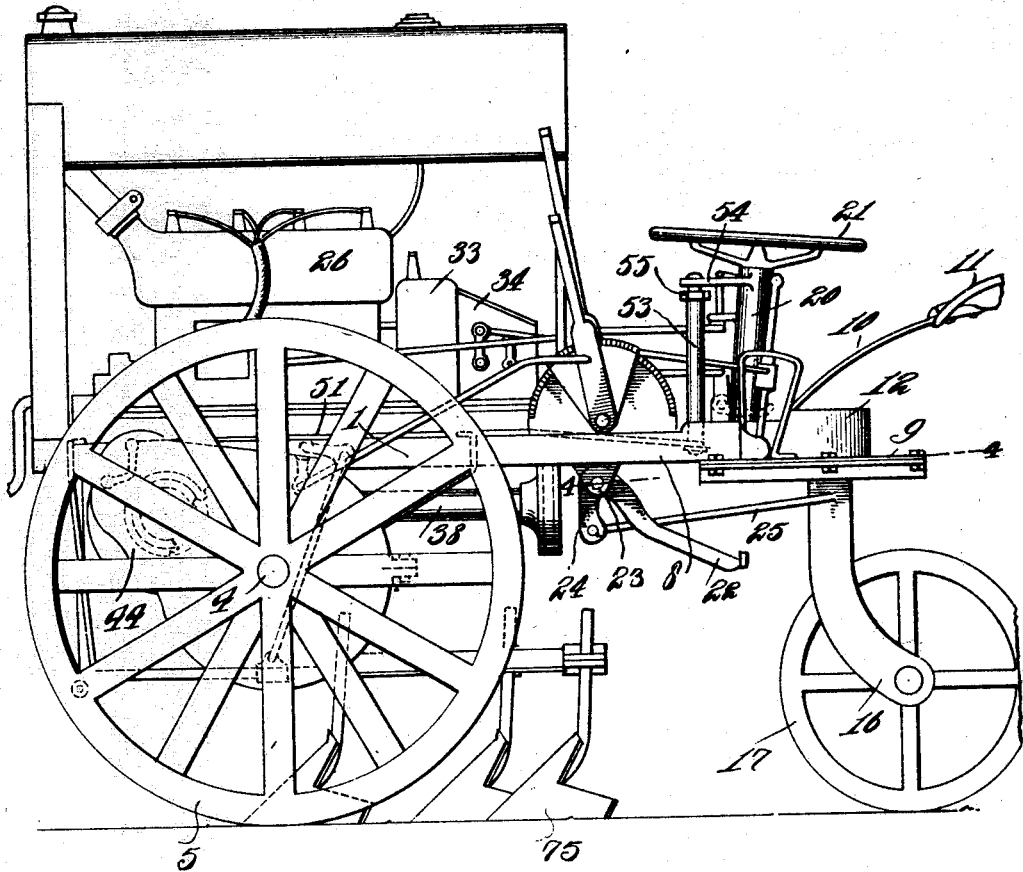
Figure 3:
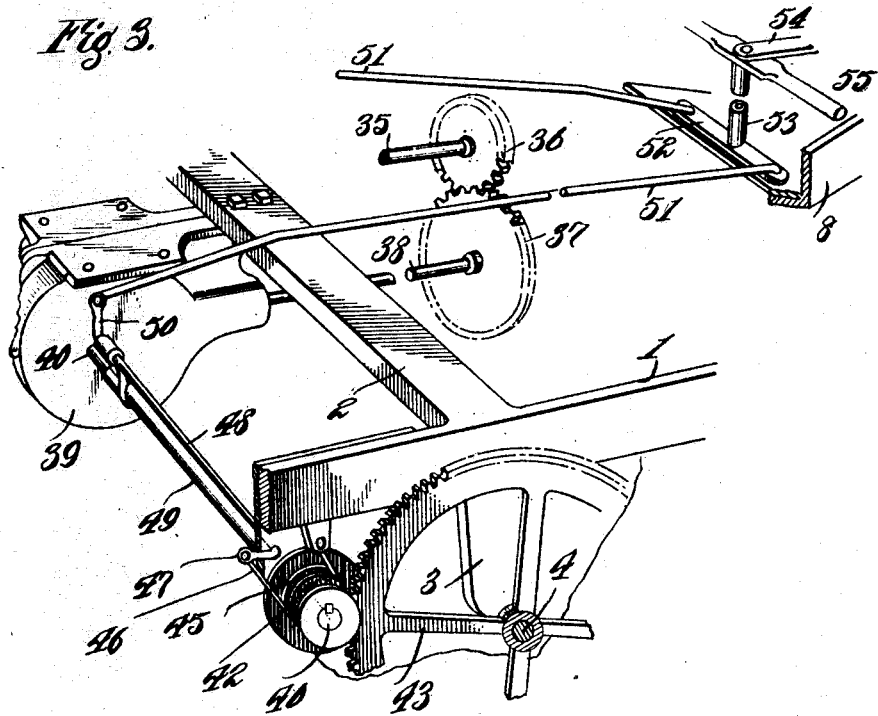
Figure 4:
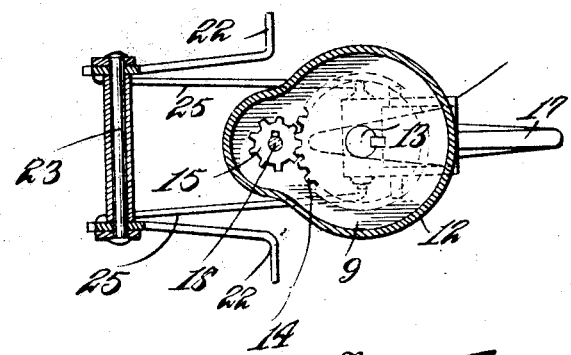

In the drawings, Figure 1 is a plan view of a tilling machine embodying the invention, Figure 2 is a side elevation of the same, Figure 3 is a perspective view showing a portion of the driving and steering mechanism, Figure 4 is a horizontal section on the line 4—4 of Figure 2.

Referring more particularly to the drawings, the numeral 1 designates the main frame of the machine which is preferably rectangular, as shown most clearly in Figure 1, and may be of any desired dimensions. This frame will preferably be constructed of channel bars or like material and has a central transverse beam 2 which aids in imparting rigidity to the frame and in supporting the engine and other parts. The beam 2 is utilized as an axle member, being disposed in the same vertical plane with hangers 3 at the ends of the frame, which hangers are formed with or have secured thereto spindles 4 upon which the ground wheels 5 are mounted.

Extending rearwardly from the rear side of the main frame are arms 8 which are secured at their rear ends to a platform 9 on which is secured a seat standard 10 carrying the driver's seat 11. A housing 12 is provided on the upper side of the platform 9, and a spindle 13 is journaled in the said platform and has its upper extremity disposed within the housing and equipped with a gear 14 meshing with a pinion 15 disposed in front of the gear and within the housing, as shown most clearly in Figure 4. The spindle 13 is formed at the upper end of a yoke 16 which is disposed below the platform and carries a steering wheel 17 which is adapted to run on the ground between the rows and at the rear of the machine so that by shifting the said wheel in its angular relation to the frame the machine will be steered as desired. The pinion 15 is fitted to the lower end of a steering post 18 housed within a column 20 which rises from the platform 9, and at the upper end of the steering post is a hand steering wheel 21 which may be easily reached from the driver's seat. By rotating the hand wheel, motion is imparted through the pinion 15 and the gear 14 to the spindle 13 so that the angular disposition of the steering wheel 17 will be shifted as desired. To relieve the strain upon the wrist and arms of the operator, I provide means whereby the steering may be accomplished by the feet of the operator, said means comprising pedals 22 arranged at the opposite sides of the platform and pivotally supported upon a rod 23 secured to the under sides of the arms 8 and disposed transversely of the same. Each pedal 22 has a depending crank 24 formed on or secured to its front end and the lower end of this crank 24 is connected by a link 25 with the respective side of the yoke 16. It will thus be seen that by pressing upon either pedal the yoke 16 may be turned pivotally and the machine thereby held to the desired path. It is to be noted that the pedals extend rearwardly and slightly downward from their pivots and are disposed below the main frame so that the force required to operate them is a slight downward pressure rather than a forward push. When the pedals are not being actuated for steering, they form a comfortable foot rest for the operator.

At the center of the main frame and disposed longitudinally thereof, an internal combustion engine 26 is mounted thereon, this engine being of any approved detail construction and being illustrated in a conventional manner only. The engine is equipped with the usual fuel, timer and ignition mechanisms and in rear of the engine, there is provided a clutch housing 33 and a transmission 34 which are also indicated conventionally and may be of any approved design. The engine shaft is connected through the clutch with a transmission shaft, indicated at 35, and a gear 36 on the transmission shaft meshes with a gear 37 on the rear end of the driving shaft 38. The driving shaft 38 extends forwardly and is supported at its front end within a differential casing 39. Differential shafts 40 are disposed transversely of the machine at the front end thereof and have their inner ends journaled in the walls of the differential casing and equipped with gears forming parts of a differential gearing, as will be understood. The outer end of each differential shaft 40 is equipped with a pinion 42 meshing with a gear 43 secured upon the hub of the adjacent ground wheel 5, and the pinion 42 and gear 43 are housed within a dust-proof gear case, indicated at 44. Each differential shaft also is equipped at its end with a brake drum 45 and a brake band 46 is secured at one end to the main frame immediately over the brake drum and is then passed downwardly and under the brake drum to extend upwardly in front of the same and be attached to a crank 47 at the outer end of a rock shaft 48. The rock shaft 48 is journaled in brackets or bearings provided therefor upon the main frame and upon a sleeve 49 which fits around the adjacent differential shaft, a crank 50 being provided at the inner end of the rock shaft, as shown most clearly in Figure 3. A connecting rod 51 is pivoted at its front end to the upper end of the crank 50 and extends rearwardly to a cross head 52 which is pivotally mounted upon the platform 9 or upon a cross bar carried by the forward portion of the said platform which is also most clearly shown in Figure 3. Fixed to the crosshead 52 is a turning post 53 which rises therefrom and has its upper end supported in a bracket 54 projecting forwardly from the steering column 20, and to the turning post, immediately below the said bracket, is secured a cross bar or handle member 55. This cross bar or handle member 55 may be easily reached from the driver's seat, and by swinging either end of said handle member forwardly the rock shaft 48 connected therewith will be rocked forwardly so that the connected brake band 46 will be loosened from the cooperating brake drum while the same elements connected with the opposite end of the crosshead 52 will be moved in the opposite direction and the brake band at the other side of the machine will be caused to fit tightly about the corresponding brake drum and thereby lock the corresponding differential pinion against rotation. As a result of this adjustment, the ground wheel at that side of the machine upon which the brake has been set will be held against rotation and will, consequently, serve as a pivot about which the machine will turn. It will thus be seen that the machine may be turned in a very small radius and it may be turned to either side accordingly as one or the other brake is set or released.

The machine is illustrated as equipped with cultivator shovels 75 and means for raising and lowering the same.

From the foregoing description, taken in connection with the accompanying drawings, it will be seen that I have provided a very compact machine which carries its own power and which may be easily steered so as to follow the rows or hills being cultivated, and it will be understood that the machine may be made sufficiently wide to cover any practical number of rows so as to cultivate them all simultaneously. While I have illustrated cultivating implements carried by the machine, it will, of course, be understood that breaking plows or planters may be substituted for the cultivators without requiring any change in the construction of the machine or any re-arrangement of its operating parts. The engine and the elements by which the engine is driven and connected with the ground-engaging implements may be of any preferred form and are manipulated in the usual manner. By setting either brake, the machine may be quickly caused to make a short turn and it may be caused to follow closely the line of the rows or furrows by setting the steering wheel 17 in the proper angular position.

Having thus described the invention, I claim:

In an agricultural machine, a frame, a platform at the rear of said frame, traction wheels adjacent the front of the frame at opposite sides thereof, a steering wheel adjacent the rear of the frame rotatably mounted and pivotally connected with the frame beneath the platform, control means for the steering wheel including a steering column rising from the platform and a hand wheel at the upper end of the column, means for imparting rotary motion to said traction wheels including a differential and shafts extending therefrom, and brake means including rocker shafts extending longitudinally of the differential shafts and each provided with a turning arm, rods extending longitudinally of said frame with their forward ends engaged with said arms, a post disposed vertically in front of said steering column with its lower end rotatably connected with the platform, a bearing for the upper end of the post extending from said column, a cross bar rigid with the post adjacent its lower end and extending from opposite sides thereof with its end engaged with the rear ends of said rods, and a handle bar rigid with the upper end of the post and projecting from opposite sides thereof.

In testimony whereof I affix my signature.

HOWARD H. GREEN. [L. S.]